United States Patent
Byrne et al.

(10) Patent No.: US 6,648,661 B1
(45) Date of Patent: Nov. 18, 2003

(54) ELECTROSTATIC DISCHARGE COUNTERMEASURE FOR DOCKING CRADLES WITH EXPOSED PINS THAT CONNECT TO AN ACTIVE INTERFACE

(75) Inventors: Daniel J. Byrne, Fort Collins, CO (US); Amol S. Pandit, Greeley, CO (US); Mark N. Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/291,463

(22) Filed: Nov. 8, 2002

(51) Int. Cl.$^7$ .......................... H01R 29/00; G06F 13/00
(52) U.S. Cl. ....................................... 439/188; 710/303
(58) Field of Search ................................ 439/188, 108; 710/304, 303; 361/683, 686; 364/708.1; 395/281, 283

(56) References Cited

U.S. PATENT DOCUMENTS

| | | | |
|---|---|---|---|
| 5,598,537 A | * | 1/1997 | Swanstrom et al. ......... 710/304 |
| 5,873,045 A | * | 2/1999 | Lee et al. ................. 455/556.2 |
| 6,089,879 A | | 7/2000 | Babcock ...................... 439/79 |
| 6,178,514 B1 | | 1/2001 | Wood ........................ 713/300 |
| 6,205,505 B1 | | 3/2001 | Jau et al. .................... 710/315 |
| 6,210,216 B1 | | 4/2001 | Tso-Chin et al. ........... 439/545 |
| 6,241,537 B1 | | 6/2001 | Tate et al. .......... 439/108 JAU |
| 6,315,609 B1 | | 11/2001 | Chung ........................ 439/607 |
| 6,347,948 B1 | | 2/2002 | Hwang ........................ 439/92 |
| 6,364,699 B1 | | 4/2002 | Hwang et al. .............. 439/555 |
| 6,382,997 B2 | | 5/2002 | Semmeling et al. ........ 439/181 |
| 6,424,525 B1 | | 7/2002 | MacLeod et al. ........... 361/686 |
| 2002/0072935 A1 | * | 6/2002 | Rowse et al. ................... 705/4 |
| 2003/0115395 A1 | * | 6/2003 | Karcher et al. ............. 710/303 |

OTHER PUBLICATIONS

US patent application No. 2001/0046801, filed Nov. 29, 2001, by Tate, Joe; et al., entitled "ESD protective connector apparatus".
US patent application No. 2002/0024791, filed Feb. 28, 2002, by Whitney, Steven J., et al., entitled "Integrated electrostatic discharge and overcuttent device".

* cited by examiner

*Primary Examiner*—Chandrika Prasad

(57) ABSTRACT

Apparatus and methods for disabling a USB or other interface connection between a personal computer and a docking cradle or device until the instant such a connection is actually needed. When the docking cradle is empty, the exposed pins are connected to a conductive ground path or is isolated. When a device is inserted into the docking cradle, the electrical signals that are connected to the personal computer by way of the interface are then switched on.

12 Claims, 2 Drawing Sheets

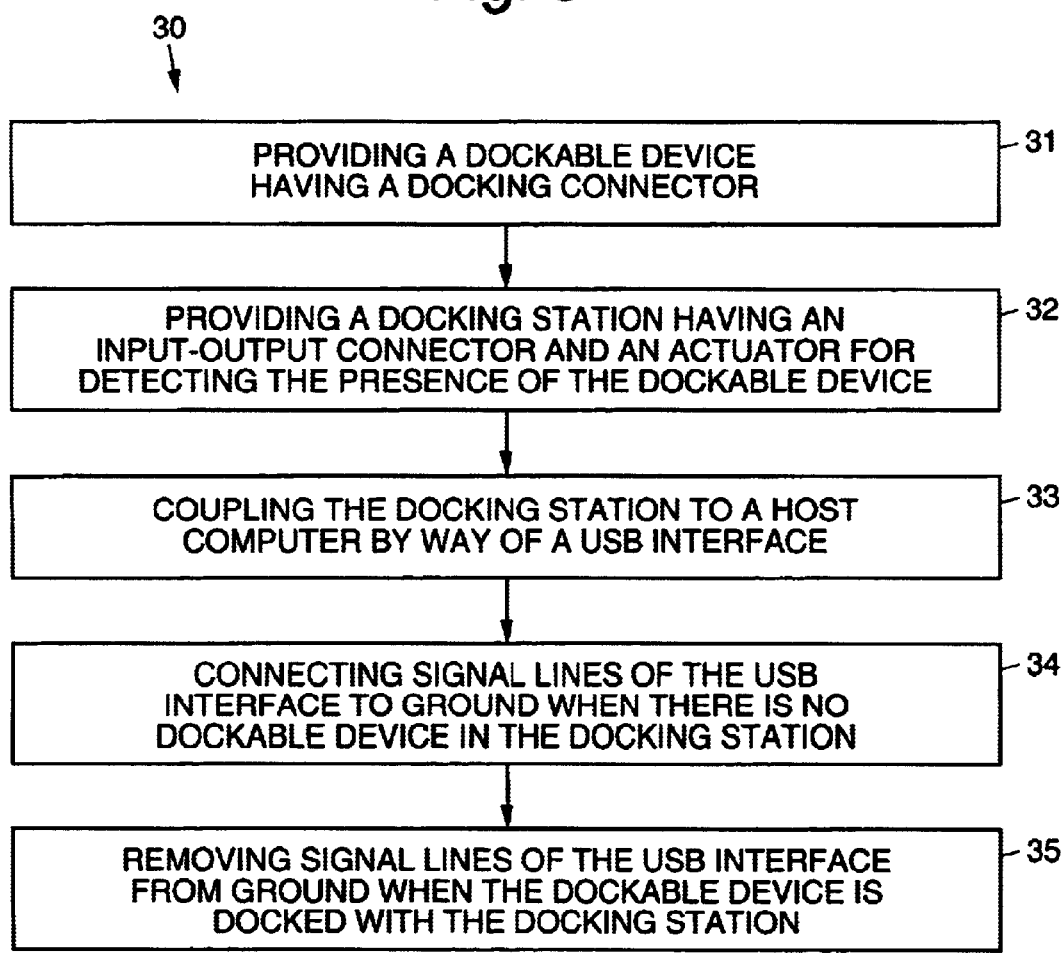

ELECTROSTATIC DISCHARGE COUNTERMEASURE FOR DOCKING CRADLES WITH EXPOSED PINS THAT CONNECT TO AN ACTIVE INTERFACE

TECHNICAL FIELD

The present invention relates generally to electrostatic discharge events in portable electronic devices, and more specifically, to improved electrostatic discharge countermeasure for docking cradles having exposed pins that connect to an active USB interface.

BACKGROUND

Portable electronic devices such as digital cameras, laptop computers, handheld personal digital assistants (PDA's), and the like, are often sold with docking stations or docking cradles. These docking devices are generally connected to a host device, usually a personal computer. Often, the host device and the docking device are connected by common interface cables and protocols, such as a Universal Serial Bus (USB) interface. In order to maintain portability and ease of use, the device to be docked (i.e.,. camera) must interface with an input-output connector on the docking cradle. The nature of the docking cradle input-output connector is often such that the pins are exposed to electrostatic discharge (ESD) events.

When an ESD event occurs on an input-output pin that is connected to a personal computer, the ESD voltage discharge can propagate through the docking cradle to the personal computer. ESD events can result in data loss, unwanted personal computer user intervention, and sometimes physical damage of the personal computer's internal electronic hardware.

The ESD event frequently poses its primary risk when there is no device in the docking station. That is, after the dockable device is inserted into a docking station, the input-output pins are no longer exposed, and no further direct threat exists.

There are many examples of conventional methods that prevent unwanted ESD discharge to this type of docking station device. Other methods of protecting a product from high levels of ESD may require the addition of additional ESD suppression components such as diodes, Zener diodes, resistors and capacitors. These components are sometimes costly, and they are subject to failure after being exposed to a large number of cycles. The number of cycles before failure is also a function of the applied voltage and resulting current. Also, the addition of typical ESD suppression devices may have the highly undesirable effect of decreasing the quality of the USB signal.

U.S. Pat. No. 6,089,879 discloses a "dual-in-line Universal Serial Bus (USB) connector including a plurality of USB ports, a plurality of signal pins associated with the ports, and a pair of mounting tabs. The USB connector is adapted for a circuit board including a first footprint for the dual-in-line USB connector situated at a predetermined location of the circuit board. Also, a second footprint is situated at a predetermined location of the circuit board for receipt of a different type of connector instead of the USB connector."

U.S. Pat. No. 6,178,514 discloses "an apparatus and method for interfacing a bus to a device. The bus includes a power line carrying power and a signal line carrying a signal. The device including a power input and a signal input. The interface includes a power output connected to the device power input; a power input connected to the bus power line; a signal input connected to the bus signal line; a signal output connected to the device signal input; an energy storage device having an input and an output, the energy storage device output connected to the interface apparatus power output; and a power converter having a power input connected to the interface apparatus power input and a power output connected to the energy storage device input, whereby the power converter receives power from the bus power line and converts it to a form suitable for charging the energy storage device. The power converter further includes a current sensor and a current limiter. The current sensor is connected in series with the power converter power input and output and has an output carrying a signal representative of the current flowing through the current sensor. The current limiter has a predetermined current limit and is operably connected to the power converter power input and power output. The current limiter also has an input connected to the current sensor output for receiving the current sensor signal representative of the current flowing through the current sensor, whereby the current limiter limits the current drawn by the device and the interface apparatus to the predetermined current limit. The interface also includes a signal conditioner that has a first input connected to the energy storage device output, a second input connected to interface apparatus signal input or the interface apparatus signal output, and an output connected to the interface apparatus signal output. The signal conditioner includes a transfer function that produces a signal conditioner output signal at the signal conditioner output. This transfer function is a function of the level of energy in the energy storage device and the level of energy of the bus signal or the signal conditioner output signal."

U.S. Pat. No. 6,205,505 discloses a "universal serial bus (USB) transmission system for transmitting a monitor control signal and a data signal from a monitor system to a main frame is provided. The universal serial bus transmission system separately includes a universal serial bus interface IC and a monitor controller IC between which the monitor control signal and the data signal are transmitted through a low-speed transmission interface, thereby reducing costs for handling electromagnetic interference (EMI). Furthermore, the universal serial bus interface can be modularized to allow the monitor system to serve as a general monitor system or a USB monitor system, thereby increasing the utility of the monitor system."

U.S. Pat. No. 6,210,216 discloses that a "USB (Universal Serial Bus) cable includes a cable having an end to which a connection device is attached. The connection device includes an insulative casing in which two USB connectors are fixed and electrically connected to the cable. Two bores are defined in a front wall of the casing for rotatably retaining two bolts. A conductive plate associated with each bolt is fixed in the casing having a first section defining a hole through which the bolt extends and a second section resiliently engaging with a conductive shield of the corresponding USB connector. The first section has step-like edges fixedly received in L-shaped slits defined in the front wall with the first section overlapping an outside surface of the front wall whereby when the connection device is secured to an external grounding panel by the bolts, the conductive plate engages with the grounding panel forming an electrical connection between the shield of the corresponding USB connector and the grounding panel."

U.S. Pat. No. 6,241,537 discloses "a handheld computer including electrostatic discharge feature. The electrostatic discharge feature is configured on the connector of the handheld computer to dissipate an electrostatic charge having a voltage exceeding a threshold level upon the connector being made with another connector of an accessory device. Examples of an accessory device include communication cradles for use with handheld computers. U.S. Pat. No. 6,241,537 also discloses that "embodiments of the invention provide a versatile connector with a current path to dissipate charge delivered by an ESD event. This feature includes potential damage from ESD events particularly during and connection and deconnection to an accessory device. Further, embodiments of the invention improve reliability in making and maintaining an electrical connection between the handheld computer and accessory device. Additionally, the current associated with an ESD event and its derivative are reduced, minimizing damage such as latchups, register erasure, data loss and physical damage."

U.S. Pat. No. 6,315,609 discloses an "improved structure universal serial bus (USB) connector female socket in which a grounding ring is disposed at the lower edge of a metal housing enclosing the connector terminals, with the two sides of the metal housing covered by an insulative integument to form the USB connector female socket. The grounding ring can be fastened by a screw and, furthermore, the metal construction of the grounding ring strengthens signal transmission, while also providing for grounding capability, thereby enabling the present invention to strengthen bidirectional signal transmission as well as effectively prevent the occurrence of electrostatic discharge (ESD) during computer peripheral (such as scanners, digital cameras, and keyboards, etc.) operation."

U.S. Pat. No. 6,347,948 discloses "a cable connector assembly includes a pair of USB connectors, a cable end connecting to the pair of USB connectors, a pair of conductive latches positioned at either side of the USB connectors, a cover enclosing the USB connectors, and grounding bars positioned on an outer surface of the cover. Each latch is V-shaped and has a first arm electrically engaging with a shrouded shell of the corresponding USB connector, and a second arm extending out from the cover to electrically and mechanically engage with a grounded panel of an electronic apparatus with which the cable connector mates. Each grounding bar has a base portion located on the cover and a pair of conductive tabs extending from the base portion into the cover and electrically engaging with the shrouded shells of the pair of USB connectors. The base portion of each grounding bar forms a pair of spring fingers extending forwardly therefrom. When the cable connector is mated with the electronic apparatus, the pair of latches engage with the grounded panel of the electronic apparatus and free ends of the spring fingers of the grounding bar press against the panel, thereby establishing electrical connection between the shrouded shells of the USB connectors and the grounded panel of the electronic apparatus."

U.S. Pat. No. 6,364,699 discloses "a cable connector assembly and a shroud partially covering the cable connector assembly. The shroud is slidable in a rear-to-front direction over the cable connector assembly. The cable connector assembly includes a pair of USB connectors, a cable end connecting to the pair of USB connectors, a pair of conductive latches positioned at either side of the USB connectors, a cover enclosing the USB connectors and the cable end at front and rear portions thereof, and grounding bars positioned on outer surfaces of the cover. Each latch is V-shaped and has a first arm electrically engaging with a shrouded shell of the corresponding USB connector, and a second arm extending out from the cover to electrically and mechanicals engage with a grounded panel of an electronic apparatus with which the cable connector assembly mates. Each grounding bar has a base portion located on the cover and a pair of conductive tabs extending from the base portion into the cover and electrically engaging with the shrouded shells of the pair of USB connectors. The base portion of each grounding bar forms a pair of spring fingers extending forwardly therefrom. When the cable connector assembly device is mated with the electronic apparatus, the pair of latches engage with the grounded panel of the electronic apparatus and the shroud is moved in the rear-to-front direction over the cable connector assembly, allowing circular lips of the shroud to abut against a portion of each latch to prevent the latches from disengaging from the grounded panel. Further, front free ends of the spring fingers of the grounding bars press against the grounded panel, thereby establishing further electrical connection between the shrouded shells of the USB connectors and the grounded panel of the electronic apparatus."

U.S. Pat. No. 6,382,997 discloses "a connector having a grounding element and a housing of an electrically insulating material. The housing includes at least one contact element comprising a contact end, an intermediate part, and a connection end. The connector also includes an electrically insulating voltage variable medium that is provided between the at least one contact element and the grounding element. The electrically insulating voltage variable medium becomes electrically conducting at a voltage that is substantially higher than the operating voltages of a device for which the connector is intended or of which it is a part. The connector described herein is relatively compact and enables constant ESD suppression."

U.S. Pat. No. 6,424,525 discloses "a system that enables a plurality of external peripheral devices to be easily connected to a conventional personal computer, or other computing device. The system can include the computer, or can alternatively be configured as a hub. In either configuration, the system includes an arcuate-shaped interface surface, on a base. One end of the interface surface includes an upright chassis, which includes a plurality of bays. Rails extend longitudinally along the interface surface, toward each bay. An external peripheral device is slid over a rail, which provides attachment and stability to the device and aligns it with the bay. Each bay includes an alignment pin, a power connection, and a data connection. Adjacent to each rail is a latch for securing an external peripheral device in a bay. The top of the chassis includes a marking to provide a visual reference that aids in attaching an external peripheral device to a bay. The rails can provide an electrical ground and/or include an element that provides electro-static discharge protection. In one embodiment, the rails are configured to provide electrical contact for coupling power into a peripheral device, and/or coupling to a data port on an external peripheral device."

U.S. Patent Application 2002/0024791 discloses that an "electrical circuit protection device has an overcurrent protection portion and an overvoltage protection portion. The overcurrent protection portion has a surface. The overvoltage protection portion is disposed on the surface. In one preferred embodiment, the overcurrent portion includes a PTC device and the overvoltage portion includes a voltage variable material. A number of terminations are configured to connect the overcurrent protection portion and the overvoltage protection portion to a printed circuit board."

U.S. Patent Application 2001/0046801 discloses that an "embodiment of the invention includes a handheld computer including electrostatic discharge feature. The electrostatic discharge feature is configured on the connector of the handheld computer to dissipate an electrostatic charge having a voltage exceeding a threshold level upon the connector being made with another connector of an accessory device. Examples of an accessory device include communication cradles for use with handheld computers." U.S. Patent Application 2001/0046801 also discloses that "Among other advantages, embodiments of the invention provide a versatile connector with a current path to dissipate charge delivered by an ESD event. This feature includes potential damage from ESD events particularly during and connection and de-connection to an accessory device. Further, embodiments of the invention improve reliability in making and maintaining an electrical connection between the handheld computer and accessory device. Additionally, the current associated with an ESD event and its derivative are reduced, minimizing damage such as latchups, register erasure, data loss and physical damage."

However, none of the above-cited patents or patent applications disclose or suggest apparatus or methods for providing electrostatic discharge protection for a docking station wherein, when there is no dockable device in the docking station the signal lines of the USB interface are connected to ground, and when the dockable device is docked with the docking station the signal lines of the USB interface are removed from connection to ground.

It is an objective of the present invention to provide for an apparatus and method that provides electrostatic discharge countermeasures for docking cradles having exposed pins that connect to an active USB interface.

SUMMARY OF THE INVENTION

To accomplish the above and other objectives, the present invention provides for apparatus and methods for disabling an active interface, such as a USB interface or connection, for example, between a personal (host) computer and a docking station or cradle until the instant such a connection is actually needed. Exemplary embodiments of the present apparatus and methods provide for a dockable device having a docking connector, docking station having an actuator for detecting the presence of the dockable device and having an input-output connector that mates with the docking connector of the dockable device, and a host computer coupled to the docking station by way of an interface.

In accordance with the present invention, the actuator connects signal lines of the interface to ground when there is no dockable device in the docking station, and the actuator removes the signal lines of the interface from connection to ground when the dockable device is docked with the docking station. Thus, when the docking cradle is empty, the exposed pins are connected to a conductive ground path or are isolated. When a device is inserted into the docking cradle, the electrical signals that are connected to the personal computer by way of the USB interface are then switched on.

In contrast to conventional methods, the present invention is not likely to experience any degradation if exposed to a very large quantity of ESD events of high voltage. In addition, the present invention should not materially impact the quality of the USB signal while providing ESD protection.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 3 illustrates an exemplary method in accordance with the principles of the present invention.

DETAILED DESCRIPTION

Figure 1:
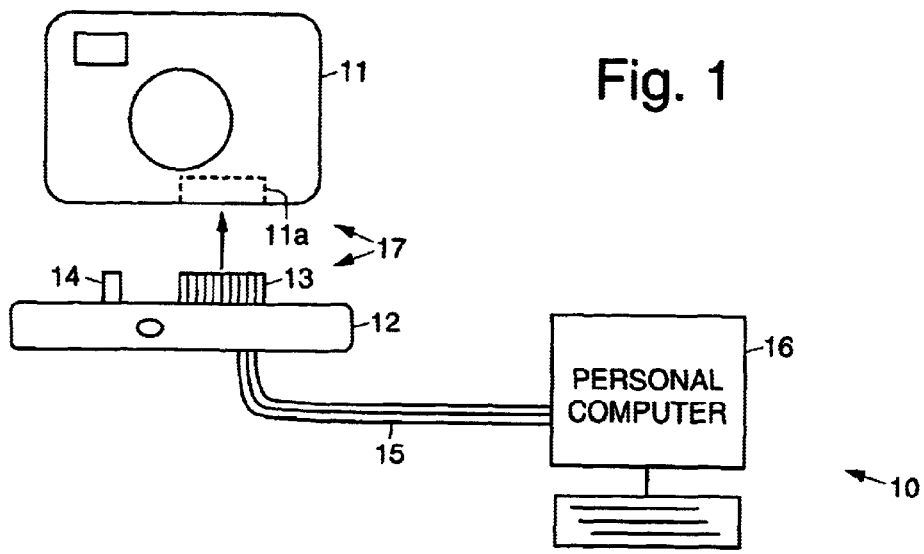
FIG. 1 illustrates an exemplary system in accordance with the principles of the present invention.

Referring to the sole drawing figures, FIG. 1 illustrates an exemplary system 10 in accordance with the principles of the present invention. The exemplary system 10 shown in FIG. 1 illustrates a typical configuration of a docking station 12 or cradle 12 having an actuator 14 for detecting the presence of a dockable device 11 (camera 11), and an input-output connector 13. The dockable device 11 has a docking connector 11a that mates with the input-output connector 13 which form universal serial bus (USB) connector 17. The docking station is coupled to a host computer 16 by way of a universal serial bus (USB) interface 15 and interface cable.

Figure 2:
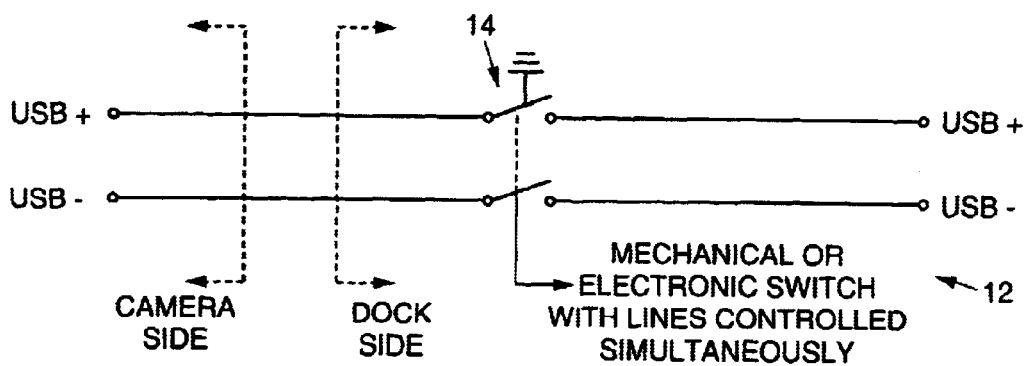
FIG. 2 shows an exemplary wiring diagram used in the system shown in FIG. 1.

FIG. 2 shows an exemplary wiring diagram of the docking station 12 shown in FIG. 1. FIG. 2 illustrates the configuration of USB communication lines (USB+, USB−) of the USB interface 15 and how their configuration changes in response to activation of the actuator 14 of the docking station 12.

With the docking station 12 connected to the host computer 16, the USB signal lines USB+, USB− (that are exposed in the input-output connector 13 of the docking station 12, are intentionally connected electrically to ground by way of the actuator 14, which may comprise a mechanical or electronic switch 14. If an ESD event occurs on an exposed pin of the input-output connector 13, the charge is dissipated directly to ground by way of the mechanical or electronic switch 14 comprising the actuator 14.

When the camera 11, a personal digital assistant (PDA) 11, or other dockable device 11, is inserted into the docking station 12 or cradle 12, the switch 14 (actuator) is latched, which then disconnects the USB lines USB+, USB− from ground and re-establishes their connection to the docking input-output connector 13. Since the dockable device 11 or camera 11 is now in the docking station 12 or cradle 12, the previously "exposed" pins of the input-output connector 13 are now shielded from future direct ESD discharges.

When the dockable device 11 or camera 11 is removed from the docking station 12 or cradle 12, the actuator 14 of the docking station 12 or cradle 12 returns to its previous condition, and again connects the exposed pins of the input-output connector 13 to ground and thus guards against future ESD events.

A mechanical actuator 14 on the docking station 12 serves to detect the presence of the dockable device 11 or camera 11 on the docking station 12. This function may also be replaced by an electronic switch 14 that responds to the condition of the dockable device 11 or camera 11 when it is "docked" as opposed to when it is "not docked."

For the purposes of completeness, FIG. 3 illustrates an exemplary method 30 in accordance with the principles of the present invention for providing electrostatic discharge countermeasures in a dockable device 11. The exemplary method 30 comprises the following steps.

A dockable device 11 having a docking connector 11a is provided 31. A docking station 12 having an input-output connector 13 and an actuator 14 for detecting the presence of the dockable device 11 is provided 32. The docking station 12 is coupled 33 to a host computer 16 by way of a USB interface 15. When there is no dockable device 11 in the docking station 12, signal lines of the USB interface 15 are connected to ground 34. When the dockable device 11 is docked with the docking station 12, the signal lines of the USB interface 15 are removed from connection to ground.

Some advantages of using the present invention to control high levels of ESD are that it eliminates the need to add ESD suppression devices along communication signal lines (i.e., the USB signal lines). The relative signal quality on the USB lines is important for proper device functionality, and its quality is generally degraded when ESD devices (diodes, for example) are present. The use of the present invention thus avoids signal quality degradation resulting from ESD-protection-related issues. The use of the actuator 14 or switch 14 may also consume less physical space than a configuration of conventionally-used Zener diodes or other ESD suppression devices.

Conventional techniques for protecting a product from high levels of ESD may require the addition of additional ESD suppression components such as diodes, Zener diodes, resistors and capacitors. The present invention eliminates the need for these other devices by creating a direct ground path for ESD discharges when the pins are exposed by the absence of the dockable device 22 (such as the camera 11).

Thus, improved apparatus and methods that provide electrostatic discharge countermeasures for docking cradles having exposed pins that connect to an active USB device have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. Apparatus comprising:
   a dockable device having a docking connector;
   a docking station having an actuator for detecting the presence of the dockable device and having an input-output connector that mates with the docking connector of the dockable device; and
   a host computer coupled to the docking station by way of an interface;
   and wherein the actuator connects signal lines of the interface to ground when there is no dockable device in the docking station, and wherein the actuator removes the signal lines of the interface connection from ground when the dockable device is docked with the docking station.

2. The apparatus recited in claim 1 wherein the dockable device comprises a camera.

3. The apparatus recited in claim 1 wherein the dockable device comprises a personal digital assistant.

4. The apparatus recited in claim 1 wherein the actuator comprises a mechanical actuator.

5. The apparatus recited in claim 1 wherein the actuator comprises an electronic actuator.

6. The apparatus recited in claim 1 wherein the interface comprises a USB interface.

7. A method of providing electrostatic discharge countermeasures for a dockable device, comprising the steps of:
   providing a dockable device having a docking connector;
   providing a docking station having an input-output connector and an actuator for detecting the presence of the dockable device;
   coupling the docking station to a host computer by way of an interface;
   when there is no dockable device in the docking station, connecting signal lines of the interface to ground; and
   when the dockable device is docked with the docking station, removing the signal lines of the interface from connection to ground.

8. The method recited in claim 7 wherein the dockable device comprises a camera.

9. The method recited in claim 7 wherein the wherein the dockable device comprises a personal digital assistant.

10. The method recited in claim 7 wherein the wherein the actuator comprises a mechanical actuator.

11. The method recited in claim 7 wherein the wherein the actuator comprises an electronic actuator.

12. The method (recited in claim 7 wherein the interface is characterized by a USB interface.

* * * * *

UNITED STATES PATENT AND TRADEMARK OFFICE
CERTIFICATE OF CORRECTION

PATENT NO. : 6,648,661 B1
DATED : November 18, 2003
INVENTOR(S) : Daniel J. Byrne et al.

It is certified that error appears in the above-identified patent and that said Letters Patent is hereby corrected as shown below:

<u>Column 8,</u>
Lines 34, 36 and 38, after "Claim 7" delete "wherein the"
Line 40, delete "(recited" and insert therefor -- recited --

Signed and Sealed this

Eighteenth Day of January, 2005

JON W. DUDAS
*Director of the United States Patent and Trademark Office*